United States Patent [19]
Portmann

[11] 3,805,931
[45] Apr. 23, 1974

[54] DRIVE- AND BRAKING DEVICE FOR A PUNCH PRESS

[75] Inventor: August Thomas Portmann, Arbon, Switzerland

[73] Assignee: Bruderer AG, Arbon, Switzerland

[22] Filed: Sept. 26, 1972

[21] Appl. No.: 292,376

[30] Foreign Application Priority Data
Oct. 1, 1971   Switzerland...................... 14371/71

[52] U.S. Cl............. 192/18 A, 192/12 C, 192/91 A, 192/85 AA
[51] Int. Cl. F16d 13/22, F16d 67/02, F16d 25/063
[58] Field of Search............ 192/18 A, 12 C, 70.27, 192/91 A, 88 A, 85 AA

[56] References Cited
UNITED STATES PATENTS

| | | | |
|---|---|---|---|
| 3,166,167 | 1/1965 | Kinsman................. | 192/85 A X |
| 3,432,014 | 3/1969 | Iwamatsu et al. ............. | 192/18 A |
| 3,000,478 | 9/1961 | Carter............................. | 192/18 A |
| 2,848,082 | 8/1958 | Dehn............................... | 192/12 C |
| 2,838,150 | 6/1958 | Eason ............................. | 192/18 A |
| 2,785,781 | 3/1957 | Johansen........................... | 192/12 C |

*Primary Examiner*—Samuel Scott
*Assistant Examiner*—Lance W. Chandler
*Attorney, Agent, or Firm*—Ladas, Parry, Von Gehr, Goldsmith & Deschamps

[57] ABSTRACT

A drive and braking device for a punch press with a compressed air actuated single-disk coupling for coupling a drive flywheel with a drive shaft, a spring-loaded single-disk brake which can be released by compressed air and which acts upon the drive shaft and is arranged between the flywheel and the machine housing. The springs acting upon the single-disk brake strive to press the single-disk brake against or towards the machine housing. For releasing the brake there is provided a compressed air actuated annular thrust piston, wherein the housing for this annular thrust piston and for the springs is arranged at a hollow compartment at one side of the flywheel, extends about the single-disk brake and is secured to the machine housing. The single-disk coupling is arranged in a hollow compartment at the other side of the flywheel.

6 Claims, 1 Drawing Figure

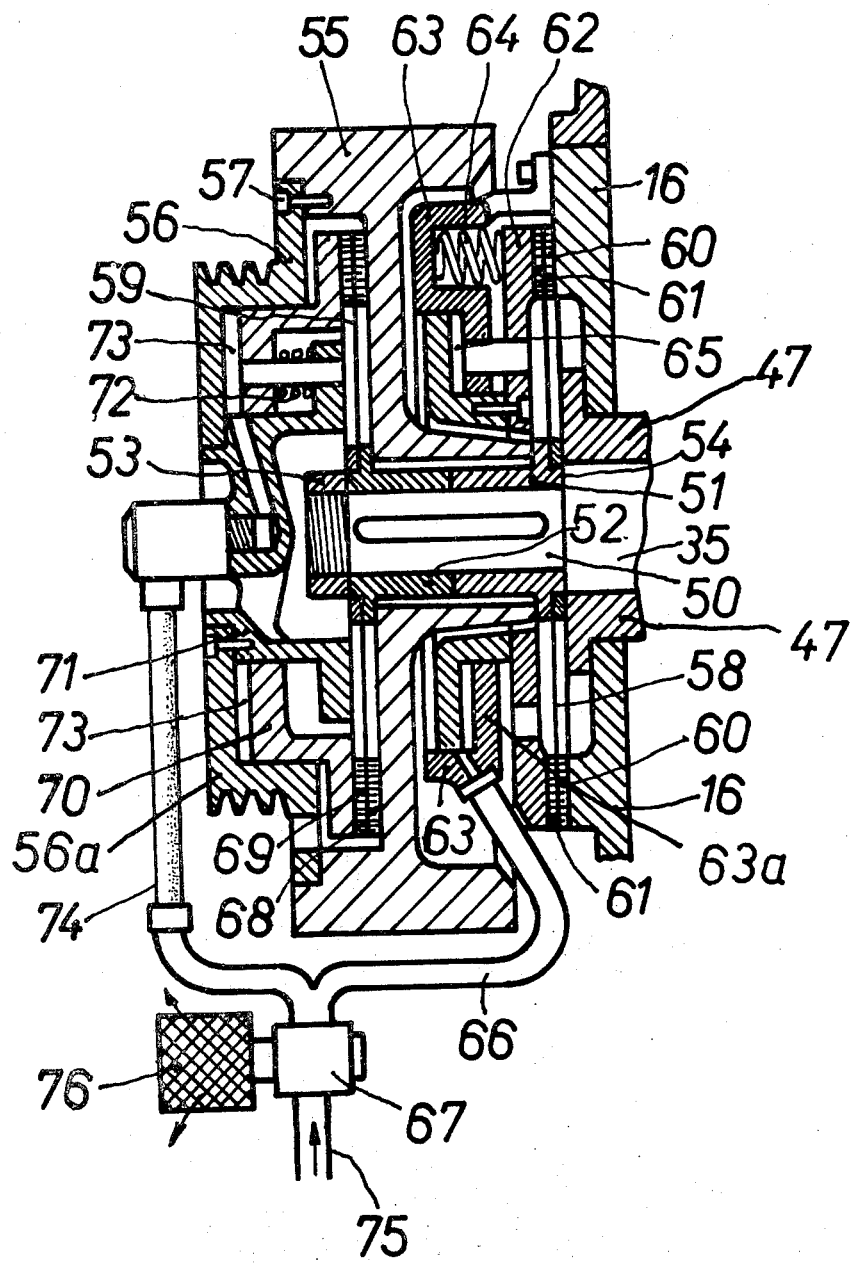

DRIVE- AND BRAKING DEVICE FOR A PUNCH PRESS

BACKGROUND AND SUMMARY OF THE INVENTION

The present invention relates to a new and improved construction of drive- and brake device for a punch press having a compressed-air actuated single-disk coupling for coupling a drive flywheel with the drive shaft and equipped with a spring-loaded single-disk brake which can be released by compressed air, the single-disk brake acting upon the drive shaft and being arranged between the flywheel and the machine housing.

According to the invention, there is obtained a simple and space saving construction of the drive- and brake device or apparatus in that springs acting upon the brake disk strive to press the brake disk against the machine housing. For releasing the brake, there is provided a compressed air actuated ring or annular thrust piston. The housing for this annular thrust piston and for the springs is arranged in a hollow compartment at one side of the flywheel, extends about the single-disk brake and is secured to the machine housing. The single-disk coupling is arranged in a hollow compartment at the other side of the flywheel. As a result, with this arrangement the essential components of the drive- and brake device are surrounded by the flywheel, so that there is realized a very compact construction.

According to a further aspect of the invention, the coupling- and brake disks can be steel disks which take-up or accommodate the vent paths by means of their inherent elasticity or resiliency, and which steel disks are fixedly seated upon the drive shaft.

Furthermore, it is advantageous to mount the drive fly-wheel so as to be freely rotatable upon hubs of the coupling- and brake disks. Hence, in this manner during slight axial elongation of the device, there can be realized a sufficiently long mounting or bearing for the flywheel.

The coupling- and brake disks can possess the same dimensions, and the sealing elements of the annular piston actuating the coupling and the annular thrust piston of the brake can possess the same dimensions.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE of the drawing illustrates in vertical axial sectional view a preferred constructional embodiment of the invention.

DETAILED DESCRIPTION OF THE PREFERRED EMBODIMENTS

Describing now the drawing, the illustrated exemplary embodiment of drive- and brake device is intended for a transverse shaft- double connecting rod-punch press for progressive or follow dies with successive punching operations, as such has been described and illustrated for instance in the commonly assigned, copending United States application, Ser. No. 292,364, filed Sept. 26, 1972, and entitled "Apparatus For Guiding The Ram Of A Punch Press." The drive- or transverse shaft 35 is mounted by bearings 47 in part of the machine housing 16. At the portion 50 of the transverse shaft 35 which protrudes past the housing portion 16 there are keyed next to one another two hubs 51, 52. These hubs 51 and 52 are axially fixed against a stepped portion 54 of the transverse shaft 35 by means of a nut member 53 threaded upon the end of the transverse shaft portion 50. A drive flywheel 55 is freely rotatable upon both hubs 51, 52, for instance mounted by means of a needle bearing or ball bearing. At the outside of the flywheel 55 there is secured through the agency of screws 57 or equivalent fastening devices a V-belt pulley disk 56 through the agency of which the flywheel 55 is driven by means of non-illustrated V-belts or the like.

At each of both hubs 51, 52 there is secured a respective thin, resilient steel disk 58 and 59. The disk 58 cooperates at its peripheral region with two friction rings 60, 61. The friction ring 60 is mounted at the outside of the housing portion 16, whereas the friction ring 61 is located at a ring or annular thrust piston 62 which is displaceably arranged in a housing 63. Compression springs 64 are housed in the housing 63, these compression springs acting upon the annular thrust piston 62 and strive to press the friction ring 61 against the steel disk 58 and the latter against the fixed friction ring 60 mounted at the housing 16. The disk 58 thus brings about braking of the transverse shaft 35 and forms a single-disk brake means. A sealed annular cylinder compartment 65 is formed at the housing 63 between the housing walls 63a and the annular thrust piston 62. A compressed air line or conduit 66 is connected with the annular cylinder compartment 65 and leads to a valve 67. When compressed air is delivered to the cylinder compartment 65 then the annular thrust piston 62 is displaced towards the left against the action of the springs 64 and vents the brake.

The steel disk 59 secured to the hub 52 cooperates at its peripheral region with two friction rings 68, 69. The friction ring 68 is mounted at the outside of the flywheel 55, whereas the friction ring 69 is located at a ring or annular piston 70 which is displaceable in a housing 56a formed by the V-belt pulley disk 56 and a hub portion 71. Compression or a pressure spring means 72 are arranged between the annular piston 70 and the hub portion 71 and strive to vent the single-disk coupling formed by the disk 59 and the friction rings 68, 69. Between the annular piston 70 and its housing 56a, there is formed means for ring-shaped or annular cylinder compartment 73 with which there is connected a compressed air line or conduit 74 leading to valve 67. When compressed air is delivered to the cylinder compartment 73 then the annular piston 70 is displaced towards the right against the action of the springs 72 and the single-disk coupling is switched-in or activated. The sealing meansfor the annular piston 70 and annular thrust piston 62 advantageously possess the same dimensions.

When the valve 67 is set or adjusted such that compressed air is delivered through the infeed line or conduit 75 to the conduits 66 and 74, then, the single-disk coupling is switched-in and the single-disk brake is simultaneously vented, so that the transverse shaft 35 is driven via the flywheel 55 through the agency of the single-disk coupling 59 and the hub 52. If the valve 67 is switched such that the conduits 66 and 74 communicate via the filter connections 76 with atmosphere or the ambient surroundings, then the single-disk brake 58 and the single-disk coupling 59 are simultaneously vented. As a result, the drive of the transverse shaft 35 is interrupted and this shaft 35 is simultaneously braked by the single-disk brake 58. Consequently, and owing to the low inherent inertia of the brake, there can be realized a very rapid braking of the punch press, so that such can be stopped in less than one revolution.

While there is shown and described present preferred embodiments of the invention, it is to be distinctly understood that the invention is not limited thereto, but may be otherwise variously embodied and practiced within the scope of the following claims. Accordingly,

What is claimed is:

1. A drive and brake device for a punch press, comprising a machine housing (16), a driven shaft (35) rotatably mounted in said housing (16), a driven flywheel (55) rotatably mounted on said shaft (35), a brake mechanism interposed between said machine housing (16) and said flywheel (55), said brake mechanism comprising a single flexible disk (58) fixedly seated upon said driven shaft (35), spring means (64) acting upon said brake disk (58) to urge the same towards said housing (16), a first compressed air actuated annular thrust piston (62) for releasing said brake, a clutch mechanism arranged at the outer side of said flywheel (55), said clutch mechanism comprising a single flexible disk (59) fixedly seated upon said driven shaft (35), spring means (72) acting upon said clutch disk (59) and urging the same to release said clutch mechanism, and a second compressed air actuated annular thrust piston (70) for actuating said clutch mechanism.

2. The drive and brake device according to claim 1, wherein said brake disk (58) and said clutch disk (59) are each fixedly mounted on a respective hub (51 and 52 respectively), said hubs (51, 52) being fixed upon said driven shaft (35), said flywheel (55) being freely rotatably mounted upon said two hubs (51, 52).

3. The device and brake mechanism according to claim 1, wherein said brake disk (58) and said coupling disk (59) have the same diameter and said first and second annular thrust piston (62, 70) have the same outer diameter.

4. The drive and brake mechanism according to claim 1 wherein said brake mechanism includes a first friction member (60) mounted at the outer side of said housing (16) and a second friction member (61) mounted on said first annular thrust piston (62), said brake disk (58) being arranged at its peripheral region between said first and second friction member (60, 61).

5. The drive and brake mechanism according to claim 1, wherein said clutch mechanism includes a first friction member (68) mounted at the outer side of said flywheel (55) and a second friction member (69) mounted on said second annular thrust piston (70), said clutch disk (59) being arranged at its peripheral region between said first and second friction member (68, 69).

6. The drive and brake mechanism according to claim 1, wherein compressed air supply means (66, 67, 74, 75) are provided for simultaneously supplying compressed air to both said first and second thrust pistons (62, 70).

* * * * *